United States Patent
Gresta

(10) Patent No.: US 8,819,738 B2
(45) Date of Patent: Aug. 26, 2014

(54) SYSTEM AND METHOD FOR REAL-TIME COMPOSITE BROADCAST WITH MODERATION MECHANISM FOR MULTIPLE MEDIA FEEDS

(75) Inventor: Gabriele Gresta, Via Caviglia (IT)

(73) Assignee: Yottio, Inc., Los Angeles, CA (US)

( * ) Notice: Subject to any disclaimer, the term of this patent is extended or adjusted under 35 U.S.C. 154(b) by 60 days.

(21) Appl. No.: 13/494,647

(22) Filed: Jun. 12, 2012

(65) Prior Publication Data

US 2013/0312041 A1   Nov. 21, 2013

Related U.S. Application Data

(60) Provisional application No. 61/647,997, filed on May 16, 2012, provisional application No. 61/654,616, filed on Jun. 1, 2012.

(51) Int. Cl.
| | |
|---|---|
| G06F 13/00 | (2006.01) |
| H04N 21/472 | (2011.01) |
| H04N 7/173 | (2011.01) |
| H04N 21/4722 | (2011.01) |
| H04N 21/482 | (2011.01) |
| H04N 5/445 | (2011.01) |

(52) U.S. Cl.
CPC .......... *H04N 21/4722* (2013.01); *H04N 21/482* (2013.01); *H04N 5/44543* (2013.01); *H04N 21/47214* (2013.01); *H04N 7/17318* (2013.01)
USPC .......................................................... 725/61

(58) Field of Classification Search
CPC .................... H04N 21/4722; H04N 21/47214; H04N 21/482; H04N 5/44543; H04N 7/17318
USPC .......................................................... 725/61
See application file for complete search history.

(56) References Cited

U.S. PATENT DOCUMENTS

| | | | | |
|---|---|---|---|---|
| 7,603,683 | B2 * | 10/2009 | Reto ................................ | 725/34 |
| 8,307,395 | B2 * | 11/2012 | Issa et al. ........................ | 725/46 |
| 2002/0091564 | A1 * | 7/2002 | Geller ............................. | 705/12 |
| 2004/0008220 | A1 * | 1/2004 | Snyder et al. .................. | 345/716 |
| 2004/0117831 | A1 * | 6/2004 | Ellis et al. ....................... | 725/53 |
| 2005/0262542 | A1 * | 11/2005 | DeWeese et al. .............. | 725/106 |
| 2005/0273830 | A1 | 12/2005 | Silver et al. | |
| 2006/0190966 | A1 * | 8/2006 | McKissick et al. ............. | 725/61 |
| 2007/0072543 | A1 | 3/2007 | Paila et al. | |
| 2008/0051026 | A1 | 2/2008 | Kim et al. | |
| 2008/0065507 | A1 | 3/2008 | Morrison et al. | |
| 2008/0146342 | A1 * | 6/2008 | Harvey et al. ................... | 463/42 |

(Continued)

OTHER PUBLICATIONS

International Search Report and Written Opinion mailed Nov. 13, 2013, for International Patent Application No. PCT/2013/041458 filed May 13, 2013, pp. 1-7.

*Primary Examiner* — Nasser Goodarzi
*Assistant Examiner* — Michael B Pierorazio
(74) *Attorney, Agent, or Firm* — Perkins Coie LLP

(57) ABSTRACT

A method of operation of a composite broadcast system includes: receiving a client AV stream from a user station and a user profile associated with the client AV stream; receiving a user interaction from the user station; approving the client AV stream for airing based on the user interaction and the user profile; receiving a program AV stream; generating a visualization based on the user interaction and the user profile; and mixing the client AV stream, the program AV stream, and the visualization for broadcasting to multiple devices.

23 Claims, 9 Drawing Sheets

(56) References Cited

U.S. PATENT DOCUMENTS

| | | | |
|---|---|---|---|
| 2008/0194334 A1* | 8/2008 | Kuok et al. ............... 463/42 |
| 2009/0319601 A1* | 12/2009 | Zvonaric et al. ............ 709/203 |
| 2010/0070999 A1 | 3/2010 | Morris et al. |
| 2011/0107220 A1* | 5/2011 | Perlman ................. 715/720 |
| 2011/0216153 A1* | 9/2011 | Tasker ................. 348/14.02 |
| 2011/0237318 A1* | 9/2011 | Sama ................. 463/9 |
| 2012/0094737 A1* | 4/2012 | Barclay et al. ............ 463/20 |
| 2012/0120183 A1* | 5/2012 | Gagneraud ............ 348/14.08 |
| 2012/0137316 A1* | 5/2012 | Elizarov et al. ............ 725/9 |
| 2012/0158852 A1* | 6/2012 | Goldsmith ............ 709/205 |
| 2012/0169836 A1* | 7/2012 | Setlur ................. 348/14.11 |
| 2012/0172117 A1* | 7/2012 | Doorgeest ............ 463/31 |

* cited by examiner

US 8,819,738 B2

SYSTEM AND METHOD FOR REAL-TIME COMPOSITE BROADCAST WITH MODERATION MECHANISM FOR MULTIPLE MEDIA FEEDS

CROSS-REFERENCE TO RELATED APPLICATION

This application claims the benefit of U.S. Provisional Patent Application Ser. No. 61/647,997 filed May 16, 2012, and the subject matter thereof is incorporated herein by reference thereto. This application also claims the benefit of U.S. Provisional Patent Application Ser. No. 61/654,616 filed Jun. 1, 2012, and the subject matter thereof is incorporated herein by reference thereto.

FIELD OF INVENTION

This invention relates to a system and method for broadcasting, and more particularly to a system and method for broadcasting with offsite participation.

BACKGROUND

Television traditionally is the preferred mass audience medium. Despite advancement in the computer and Internet technology, television has not been replaced by computers. Television reaches to a much larger audience than network connected computers. Accordingly, a television channel remains the quintessential mass audience medium.

One of the main disadvantages of the television medium, however, lies in the difficulty of having the audience and the show interact, as communication is traditionally unidirectional, that is, from a broadcaster to the receiving viewers. Many efforts were made throughout time to allow the audience at home to interactively take part with television programs, but these efforts always turned out to be limited and unsatisfactory because of limited participation or delays in interaction.

DISCLOSURE OF INVENTION

The present invention provides a method of operating a composite broadcast system including: receiving a client AV stream from a user station and a user profile associated with the client AV stream; receiving a user interaction from the user station; approving the client AV stream for airing based on the user interaction and the user profile; receiving a program AV stream; generating a visualization based on the user interaction and the user profile; and mixing the client AV stream, the program AV stream, and the visualization for broadcasting to multiple devices.

The present invention also provides a method of operating a composite broadcast system including: receiving a client AV stream from a user station and a user profile associated with the client AV stream; approving the client AV stream for airing based on the user profile; receiving a program AV stream; receiving an application input from an API module; generating a visualization based on the application input; and mixing the client AV stream, the program AV stream, and the visualization for broadcasting to multiple devices.

The present invention also provides a composite broadcast system including: a user input module, coupled to a mix module, for receiving a client AV stream from a user station and a user profile associated with the client AV stream; a user interaction module, coupled to a visualization module, for receiving a user interaction from the user station; a selection module, coupled to the user input module and the user interaction module, for approving the client AV stream for airing based on the user interaction and the user profile; a program AV module, coupled to the mix module, for receiving a program AV stream; the visualization module for generating a visualization based the user interaction and the user profile; and the mix module for mixing the client AV stream, the program AV stream, and the visualization for broadcasting to multiple devices.

Some embodiments of the invention have other aspects, elements, features, and steps in addition to or in place of what is described above. These potential additions and replacements are described throughout the rest of the specification.

DETAILED DESCRIPTION

Figure 1:
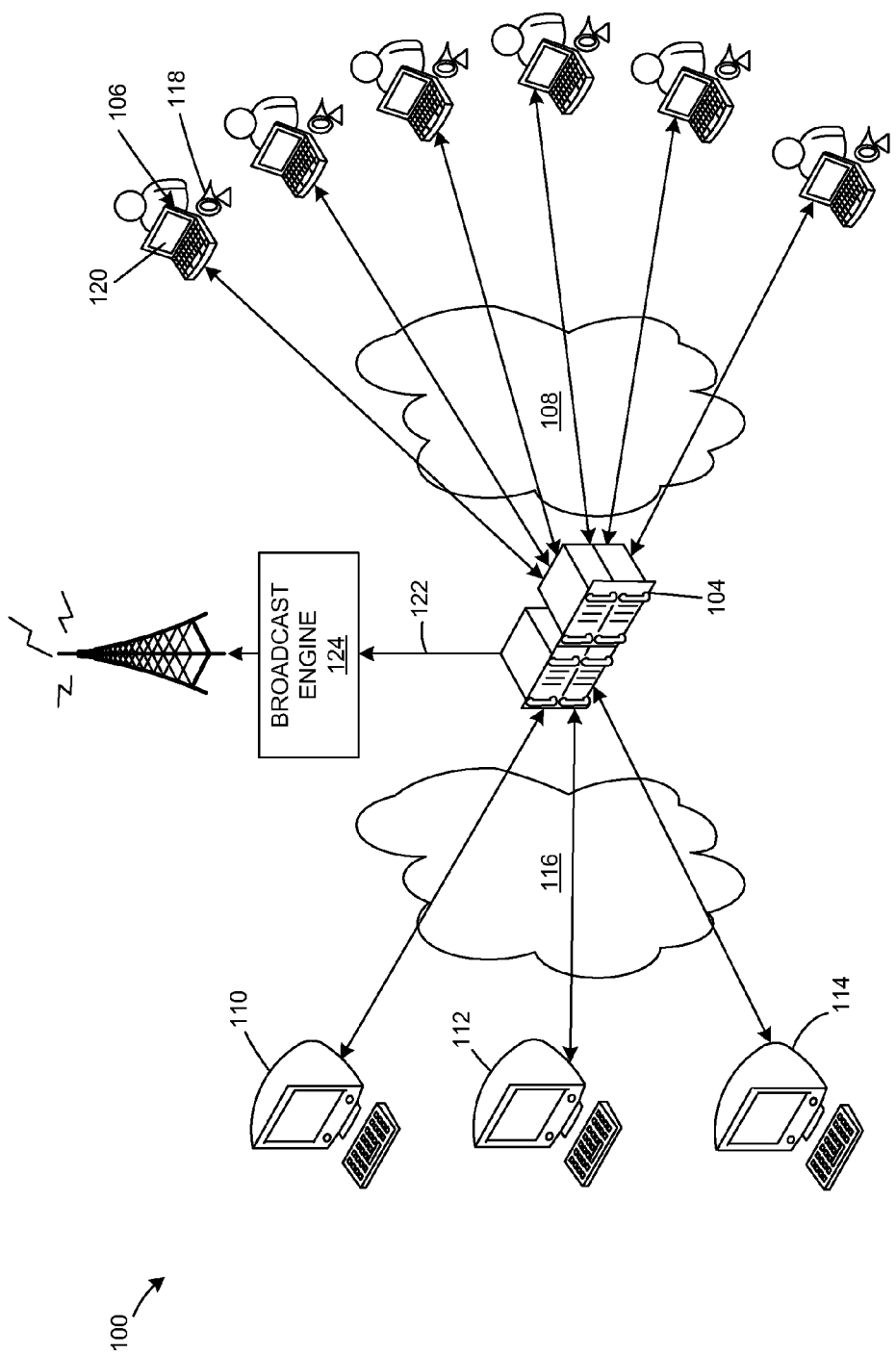
FIG. 1 illustrates a composite broadcast system in an embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for operating a composite broadcast system with moderation mechanism for multiple video feeds.

FIG. 1 illustrates a composite broadcast system 100 in an embodiment of the present invention.

In this embodiment, a number of users are watching a live media broadcast, including for example TV shows and radio shows. Through the system according to this invention, they can actively take part in the media broadcast, interacting live. The composite broadcast system 100 includes a cast server 104. The composite broadcast system 100 can include a user terminal 106 or multiple instances of the user terminal 106, although it is understood that the composite broadcast system 100 can be operational without the user terminal 106. The cast server 104 is connected to the user terminal 106 via a user network 108. The user network 108 can be the Internet, a local network, a wireless network, or any other digital interconnection. The user network 108 can be any form of Internet connection. Preferably, the user network 108 has at a minimum 2 Mbit per second download speed and 512 Kbit per second upload speed. The user terminal 106 is defined as a machine for joining a live broadcast remotely. The user terminal 106 can be, but not limited to, a server desktop, a desktop computer, a computer cluster, a mobile computing device such as a notebook, a laptop, a handheld computer, a mobile phone, a smart phone, a PDA, a Blackberry device, an iPhone, or an Android smart phone.

The composite broadcast system 100 can also include a moderator terminal 110, a director terminal 112, and a livecast terminal 114, although it is understood that the composite broadcast system 100 can be operational with only a subset of the moderator terminal 110, the director terminal 112, and the livecast terminal 114. The cast server 104 are connected to the moderator terminal 110, the director terminal 112, and the livecast terminal 114 via a broadcast network 116. The broadcast network 116 can be the Internet, a local network, a wireless network, or any other digital interconnection. The broadcast network 116 can be a broadcaster specific connection. For example, the broadcast network 116 can have 10 Mbit per second download speed and 10 Mbit per second upload speed. Preferably, the broadcast network 116 should have minimum 5 Mbit per second download speed and 1 Mbit per second upload speed. These requirements can allow smooth operation of the director terminal 112, the moderator terminal 110, the livecast terminal 114, and up to nine or more instances of the user terminal 106. While it is illustrated that the user network 108 and the broadcast network 116 are separate network, it is understood that the user network 108 and the broadcast network 116 can be the same network.

The moderator terminal 110 is defined as a machine for receiving a feed from a moderator operating at the computer machine terminal. The moderator terminal 110 can have audio and video outputs. The moderator terminal 110 can also have audio and video inputs. The moderator terminal 110 can receive, select, talk, chat, and edit profile of all users connected to the composite broadcast system 100. The moderator terminal 110 can select users corresponding to instances of the user terminal 106 and send them to the director terminal 112. The moderator terminal 110 can be, but not limited to, a server desktop, a desktop computer, a computer cluster, a mobile computing device such as a notebook, a laptop, a handheld computer, a mobile phone, a smart phone, a PDA, a Blackberry device, an iPhone, or an Android smart phone.

Figure 2:
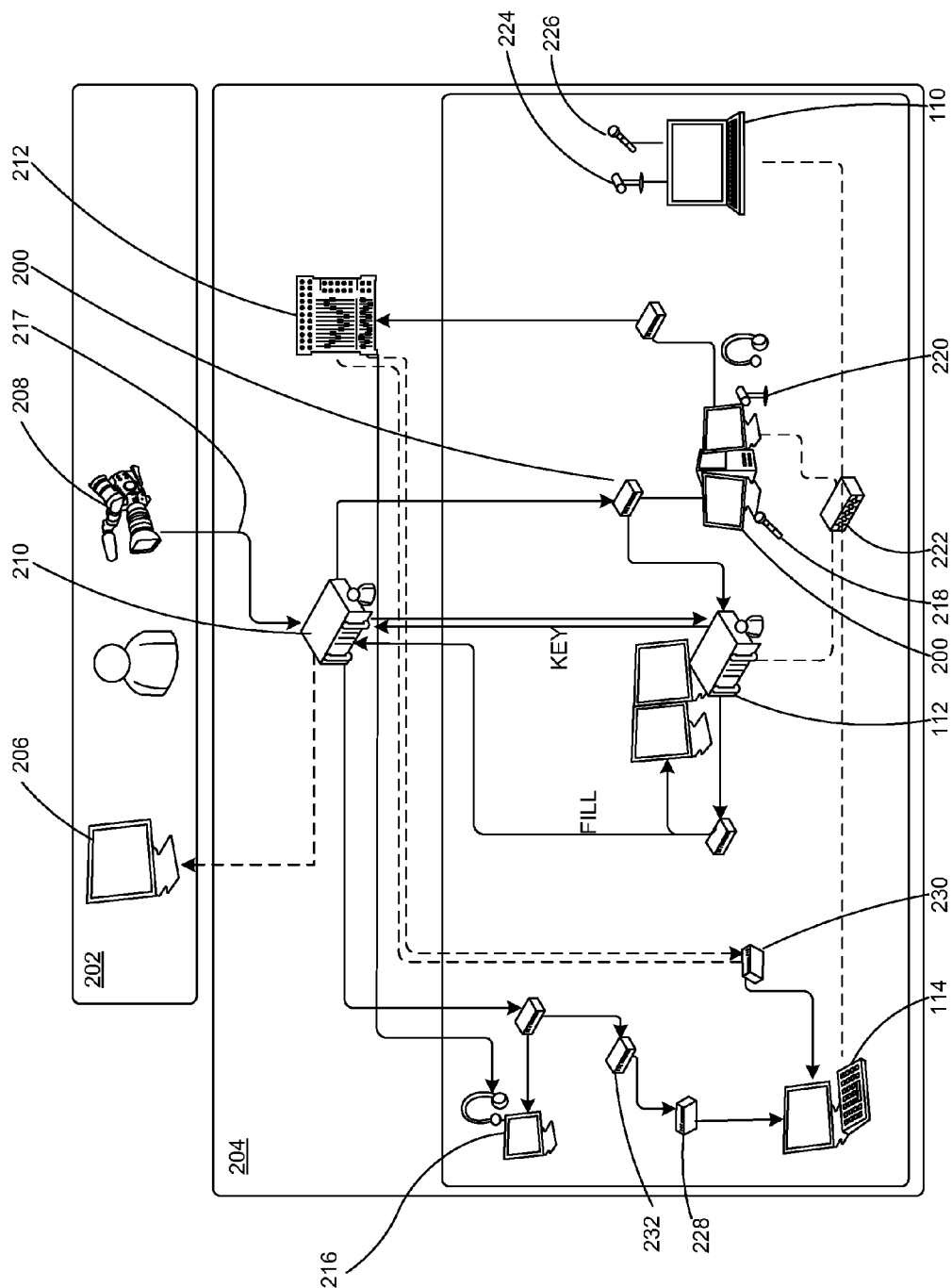
FIG. 2 depicts an example of a data flow diagram of the composite broadcast system.

The director terminal 112 is defined as a machine for managing the live video cast. The director terminal 112 can have audio and video inputs. The director terminal 112 can also have audio and video outputs. The director terminal 112 can receive, select, talk, chat, and send to users operating on instances of the user terminal 106, either on-air or off-air. The director terminal 112 can receive from the moderator terminal 110 a list of potential users to put on air. The audio and video outputs of the director terminal 112 can be connected to a director desk as illustrated in FIG. 2. The director terminal 112 can be, but not limited to, a server desktop, a desktop computer, a computer cluster, a mobile computing device such as a notebook, a laptop, a handheld computer, a mobile phone, a smart phone, a PDA, a Blackberry device, an iPhone, or an Android smart phone.

The user terminal 106 can include hardware and software to enable a connection with the user network 108. Each instance of the user terminal 106 can include an audio video acquisition system 118, such as a web-cam and a microphone or similar mediums to stream or record audio and video. The user terminal 106 can also include a display device 120. The display device 120 can display the television signal picked up via the user network 108, radio, satellite media broadcast, cable TV, on-air TV, or a combination thereof. The display device 120 can display in either analogue or digital mode. The display device 120 can be a monitor or a television equipped with a decoder to interpret the received signal.

The livecast terminal 114 is defined as a machine for performing a livecast stream 122 to all video participants connected via the user terminal 106 through the cast server 104. The livecast stream 122 can be managed by the director terminal 112 and routed through the cast server 104. The livecast terminal 114 can have or be attached to a video capture board and an audio board. The livecast terminal 114 can be, but not limited to, a server desktop, a desktop computer, a computer cluster, a mobile computing device such as a notebook, a laptop, a handheld computer, a mobile phone, a smart phone, a PDA, a Blackberry device, an iPhone, or an Android smart phone.

The cast server 104 can be connected to a broadcast engine 124. The broadcast engine 124 can be a stand alone machine or a machine or module within the cast server 104 for broadcasting the livecast stream 122 as a mass media. The broadcast engine 124 can send the livecast stream 122 through antennas, broadcast towers, video switches, or other broadcasting means to transmit the livecast stream 122 to TV channels on air, cable, DirectTV, satellite, Set Top Boxes, Game Consoles, Augmented Reality Devices including without limitation 3D Glasses, any other video enabled device, any other augmented reality device, other digital video subscriptions, or a combination thereof.

FIG. 2 depicts an example of a data flow diagram of the composite broadcast system 100.

The composite broadcast system 100 can include a studio area 202 and a director desk 204. The studio area 202 can include an anchor monitor 206 and an anchor camera 208. The anchor monitor 206 can be used by an anchor man of the show to see the livecast stream 122 of FIG. 1. The anchor camera 208 can be a high definition camera capturing video and audio from the setting of the studio area 202.

The director desk 204 can include a video switch 210, an audio mixer 212, a MyCast 3D module 214, the director terminal 112, the livecast terminal 114, and a monitor device 216. The audio mixer 212 is a device capable of distributing audio signal from one or more inputs to one or more outputs in one or more different formats. The audio mixer 212 can receive selected audio streams from the user terminal 106, the director terminal 112, or the moderator terminal 110 through the director terminal 112. The audio mixer 212 can distribute the streams to the livecast terminal 114 and the monitor device 216.

The video switch 210 is a device capable of receiving multiple inputs and outputs of audio and/or video and routing a subset of the audio and video to any other device. The anchor camera 208 can be connected to the video switch 210. The video switch 210 can output the livecast stream 122 to the anchor monitor 206, the monitor device 216, or the livecast terminal 114. The video switch 210 can also output a reference video such as a program feed 217 from the studio area 202 to the director terminal 112.

The video switch 210 can also receive input from the MyCast 3D module 214. For example, the video switch 210 can receive a 3D output video key signal and a 3D output video fill signal from the MyCast 3D module 214. The MyCast 3D module 214 is a device that can convert a video stream to a three dimensional video signal. The MyCast 3D module 214 can include a monitoring system to view the 3D output video key signal and the 3D output video fill signal.

The role of the MyCast 3D module 214 is to add motion graphics in 2D and/or 3D on the video of the users operating instances of the user terminal 106 or the program feed 217. On top of the graphics effects, the MyCast 3D module 214 can provide to the director terminal 112 metadata in a dynamic solution. For example, under normal operation when the director of the media broadcast operating the director terminal 112 wants to add a nick name of the user or the location of the user terminal 106, the director can then add a visual label of the nickname or the location manually through a graphic system through the director desk 204. However, the MyCast 3D module 214 can provide a video, and manipulate it in real time, and can provide any combination of animation graphics, labels, or metadata such as nicknames and location of the user automatically by accessing a database on the director terminal 112 or the cast server 104. The MyCast 3D module 214 can also incorporate the multimedia effects such as the video, the animation, and the labels directly into the livecast stream 122. The MyCast 3D module 214 can include augmented reality applications, such as overlaying sound, video, graphics, statistics, labels, or a combination thereof to the media feeds.

The video switch 210 can be coupled directly to the director terminal 112 to receive the program feed 217. The director terminal 112 can receive audio and video feeds from the user terminal 106. The director terminal 112 can have a director microphone 218 and a director camera 220. The director microphone 218 and the director camera 220 can be modules on a single device. The director terminal 112 can select and mix audio and video feeds from instances of the user terminal 106, the moderator terminal 110, the anchor camera 208, and the director microphone 218 and the director camera 220 feeds.

The moderator terminal 110 can be connected to the director terminal 112 via a network switch 222. The moderator terminal 110 can have a moderator camera 224 and a moderator microphone 226. The moderator terminal 110 can send an audio feed from the moderator microphone 226 to the director terminal 112 and a video feed from the moderator camera 224 to the director terminal 112.

The livecast terminal 114 can be connected to the director terminal 112 via the network switch 222. The livecast terminal 114 can receive the program video of the program feed 217 from the video switch 210 and the program audio of the program feed 217 from the audio mixer 212. Alternatively, the program video from the video switch 210 can first be received by a video capture board 228 before being passed onto the livecast terminal 114 and the program audio can first be received by an audio board 230 before being passed onto the livecast terminal 114.

The livecast terminal 114 can receive all audio streams including that of the host, the special guest, the moderator, the director, or a combination thereof except the audio stream from the user terminal 106. The audio streams can be provided by the audio mixer 212. The livecast terminal can also receive all of the video streams provided by the video switch 210. The livecast terminal 114 can be labeled as a special user to the cast server 104, having the same software modules installed as the user terminal 106. The livecast terminal 114 can have a special username and password to access the cast server 104.

The livecast terminal 114 can perform or transmit the livecast stream 122 to all users operating on instances of the user terminal 106. The livecast terminal can be connected to the director desk 204. The livecast terminal 114 can allow the user terminal 106 to play the livecast stream 122 by transmitting the livecast stream 122 over the user network 108.

Each video participant can receive audio, video, or a combination of both, of all other video participants. Each video participant's own audio stream can be excluded from the livecast stream 122. It has been unexpectedly found that this feature can avoid the Larsen effect. Here, a video participant is defined as an operator of the user terminal 106 who is actively participating on the show hosted by the composite broadcast system 100. A video participant can appears on the livecast stream 122.

The livecast terminal 114 can function without user input once it is setup. The livecast terminal 114 can communicate with the user terminal 106 including sending the livecast stream 122 through the network switch 222, the broadcast network 116, the cast server 104, the user network 108, or a combination thereof.

The director desk 204 can include a plurality of a signal converter 232. The signal converter 232 can convert video and/or audio output signals from a device in the composite broadcast system 100 to a proper format for another device of the composite broadcast system 100. For example, the signal converter 232 can convert a HD SDI signal to a DVI signal and vice versa or a SDI signal to an analog signal and vice versa.

Figure 3:
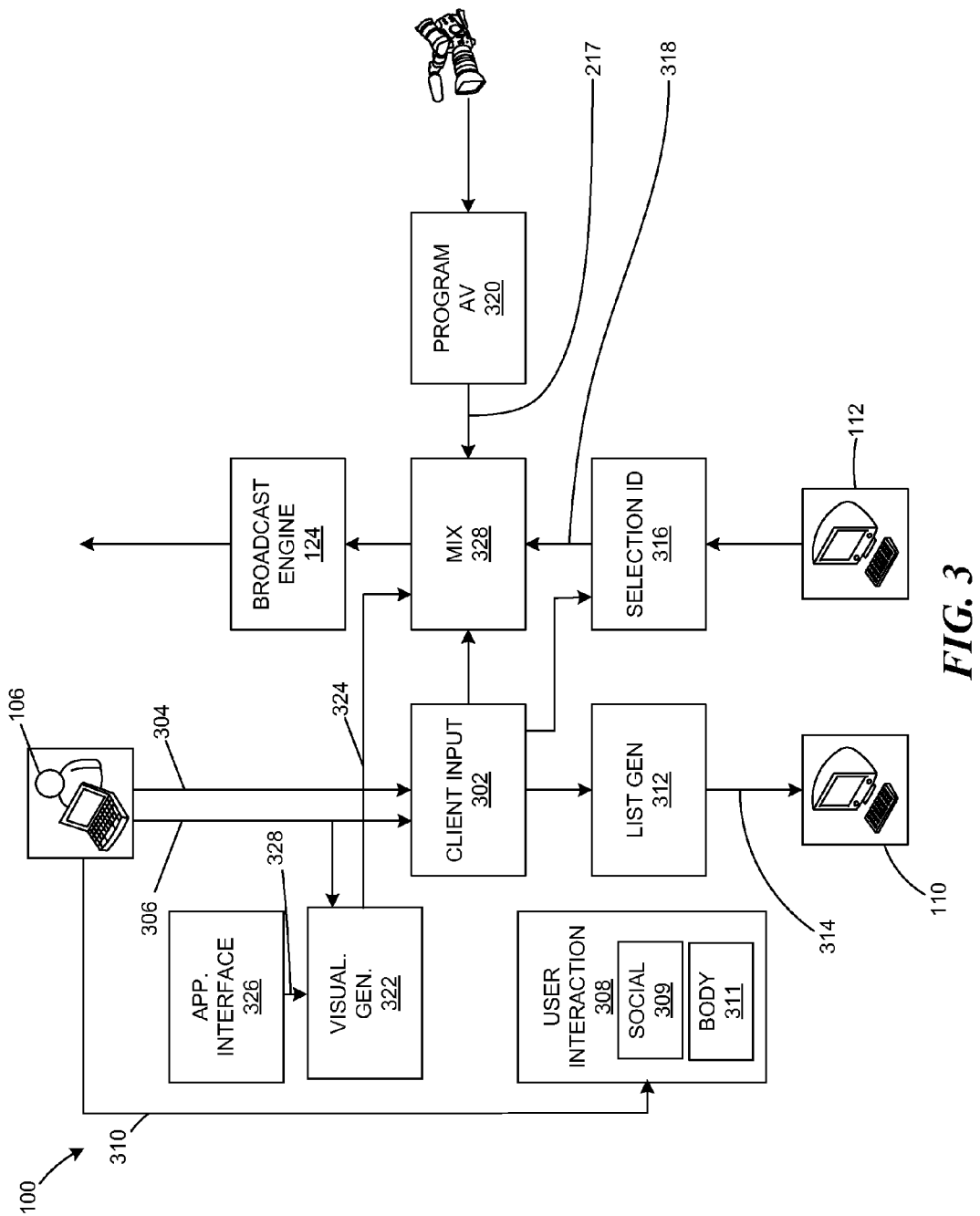
FIG. 3 depicts a control flow of the composite broadcast system.

FIG. 3 depicts a control flow of the composite broadcast system 100. The modules in the control flow can be implemented as a hardware module or a software module on a machine such as the one described in FIG. 9. For example, the modules described can be implemented on the director terminal 112, the moderator terminal 110, the cast server 104, or a combination thereof.

The composite broadcast system 100 can include a user input module 302. The user input module 302 is for receiving a user feed 304 from the user terminal 106. The composite broadcast system 100 can identify or receive the user profile 306 from the user terminal 106 or from the cast server 104. For example, the user profile 306 can first be stored on the cast server 104 when a user of the user terminal sign-up to participate in the composite broadcast system 100. Later, the director terminal 112 or the moderator terminal 110 can access the user profile 306 via the user terminal 106 or the cast server 104.

The user feed 304 can include a web-cam video feed of a user operating the user terminal 106. The user feed 304 can include an audio feed from the user terminal 106 as well.

The user profile 306 can include attributes related to the user terminal 106 or the operator of the user terminal 106. For example, the user profile 306 can include age, gender, ethnicity, location, nationality, educational level, or a combination thereof. The user profile 306 can also include how long the operator of the user terminal 106 has been using the composite broadcast system 100. The user profile 306 can also include access setting on the user terminal 106, such as who can have a share vision with the user terminal 106.

The user profile 306 can include a history of boos and claps targeted at the operator of the user terminal 106. The user profile 306 can include previous predictions made by the operator of the user terminal 106. The user profile 306 can include polls and votes answered and cast by operator of the user terminal 106. The user profile 306 can include ranking of the operator of the user terminal 106 including expertise ranking, community reputation ranking, moderator ranking, and social ranking such as number of friends on a social network, or a combination thereof.

The user profile 306 can also include geo-positioning of the user terminal 106. For example, the user profile 306 can include a Global Position System (GPS) coordinates of the user terminal. For another example, the user profile 306 can include network location information, such as IP address. For yet another example, the user profile 306 can include information about where the users have opted in from, such as which website linked the user to join the composite broadcast system 100. Potential origin web domains and origin websites can include Facebook, Twitter, an online widget, or an online mobile application.

The composite broadcast system 100 can include a user interaction module 308. The user interaction module 308 can receive and record an interaction 310 between the user terminal 106 and the composite broadcast system 100. For example, the interaction 310 can include a user answer, a user vote, a user prediction, a user to user invitation, a user ranking, a user feedback such as in the form of boo, clap, like, or thumbs down, or a combination thereof.

The user interaction module 308 can include a social interaction module 309. The social interaction module 309 is for maintaining a social platform in the composite broadcast system 100. The social interaction module 309 can record and analyze social interaction instances of the interaction 310 from the users based on their tastes determined from: what they see, comment on, follow, like, interact with, or a combination thereof.

The social interaction module 309 provides to the user terminal 106 a history of all the publisher contents watched, including the livecast stream 122. The social interaction module 309 can share contents other users have watched, liked, or commented on, with the user terminal 106, the cast server 104, the director terminal 112, or a combination thereof. The social interaction module 309 can further push feeds related to new contents from the composite broadcast system 100 to the user terminal 106.

Based on an analysis of a history of previous instances of the interaction 310, the social interaction module 309 can predict potential contents for the user terminal 106 to view. The predicted potential contents can be placed in a push feed to the user terminal 106.

The social interaction module 309 can further analyze the interaction 310 of the user terminal 106 and push feeds related to the interaction 310 to friends of the user operating the user terminal 106. "Friends" in this context are defined as directly connected user accounts within a social network website or application to a source user.

The user terminal 106 can receive, through the social interaction module 309, feeds regarding contents, activities, and agenda of the friends to the user of the user terminal 106. The social interaction module 309 can be implemented as a website portal. This allows the user to know what the friends are watching or have on their agenda. The social interaction module 309 can be configured according to a privacy setting regarding what to share and what not to share. The social interaction module 309 can be configured to determine what kind of feeds to receive based on the friends of the user. The user can activate or deactivate suggestions and recommendations determined by the social interaction module 309.

The social interaction module 309 can collect information of what a user of a user account has watched, liked, or commented on, and the social interaction module 309 can share that information with socially connected accounts of the user. The social interaction module 309 can send push feeds related to new contents from the composite broadcast system 100 to the user terminal 106. The social interaction module 309 can send push feeds related to contents that a user might like based on the user profile 306 and a history of the recorded interaction 310. The social interaction module 309 can facilitate a social virtual room by video, audio, or text chatting while the user terminal 106 is engaged with the composite broadcast system 100. The user terminal 106 can include an electronic program guide that can be configured to activate or deactivate the feeds from the social interaction module 309, such as suggestions from friends.

It has been unexpectedly found that the social interaction module 309 can allow a publisher to attract new audience, to increase audience engagement, to increase audience understanding, and to open new advertising opportunities. The social interaction module 309 can attract new audience and increase audience engagement by recording and publishing more user activities on social networking websites. Users can opt-in and authorize the social interaction module 309 to publish any of the user's activities. This can include the user reading an article, watching a video, or even just participating in a game hosted by the composite broadcast system 100. All publications, such as news feeds in a social website, generated by the social interaction module 309 can redirect the users to the composite broadcast system 100 or the livecast stream 122. Because this type of frictionless sharing can attract positive attention to the user and to everything related to the livecast stream 122, users are more likely to participate.

The user interaction module 308 can also include a body language module 311. The body language module 311 is for collecting and analyzing a body gesture from the user feed 304. For example, the body language module 311 can detect gestures and movements of a user from the user feed 304 to allow the user to play with visualized objects in the livecast stream 122. A game can be hosted on the cast server 104. The game can be played with gestures and body languages in real-time as analyzed from the user feed 304.

The composite broadcast system 100 can include a list generation module 312 coupled to the user input module 302. The list generation module 312 is for identifying a user list 314 of every instance of the user terminal 106 connected to the composite broadcast system 100.

The composite broadcast system 100 can include a selection module 316 coupled to the list generation module 312. The selection module 316 is for selecting a user subset 318 from the user list 314 received from the list generation module 312. The user subset 318 includes a subset from the user list 314 to be broadcasted later. The selection module 316 can select the user subset 318 based on proposals of users from the moderator terminal 110. The moderator operating the moderation terminal 110 can review the user profile 306 and communicate with the user on the user terminal 106 to determine whether the user is fit to be on air. The selection module 316 can approve or finalize the user subset 318 via the director terminal 112.

In another embodiment of the present invention, the selection module 316 can select the user subset 318 automatically. For example, the moderator terminal 110 or the director terminal 112 can automatically select the user subset 318 with users from a specific region as specified in the user profile 306. Other information in the user profile 306 can be used to automatically select the user subset 318, such as age, gender, expertise, language spoken, time spent in the community of viewers of the show. For another example, the moderator terminal 110 or the director terminal can automatically select the user subset 318 with users who have voted "Answer A" on a multiple choice question asked on the show, as specified by the interaction 310.

It has been unexpectedly discovered that the automatic selection can improve speed of computer processing and transmission of data in the overall system. That is, automatically selecting a video stream based on the interaction 310 and the user profile 306 can streamline the composite broadcast system 100 to save processing time. Hence, user experience can be improved by directing more processing power or data storage to highly-rated users. Further, the automatic selection can scale the selection process to filter through many more video streams.

The composite broadcast system 100 can include a program AV module 320. The program AV module 320 can receive a program feed 217 from the cast server 104 or the video switch 210 of FIG. 2. The program feed 217 can be streamed directly from the studio area 202 of FIG. 2.

Figure 8:
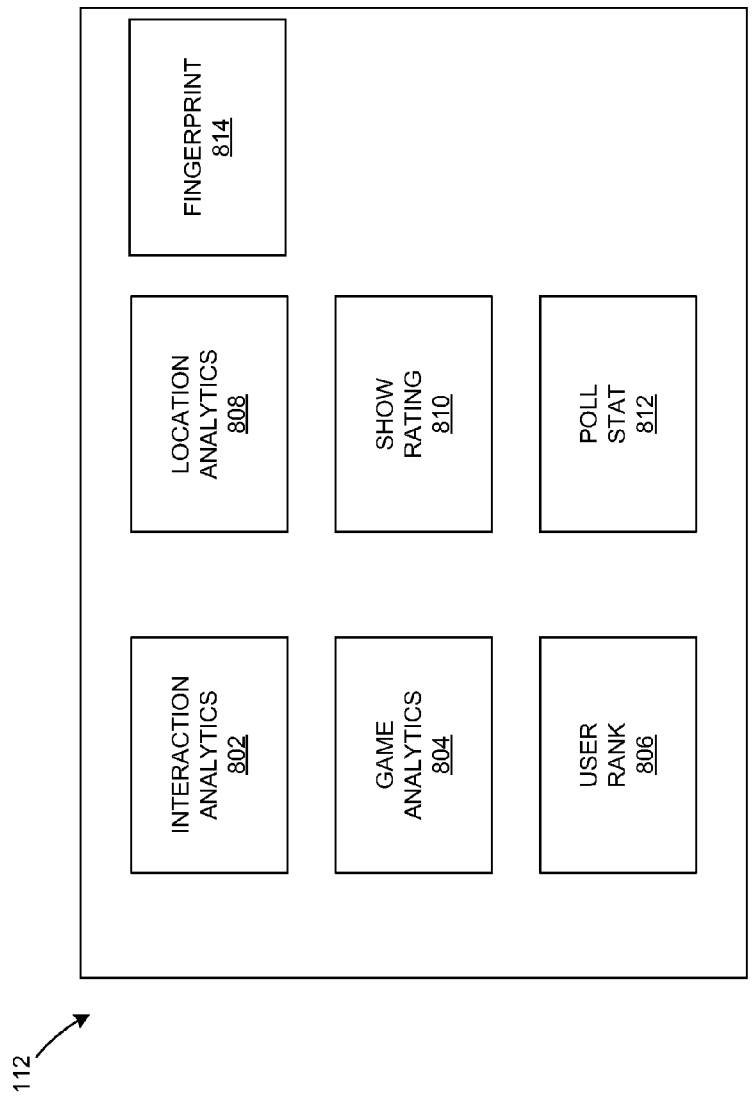
FIG. 8 depicts a block diagram of modules in the director terminal.

The composite broadcast system 100 can include a visualization generator module 322. The visualization generator module 322 can be for generating a visual aid 324 based on the user profile 306, the interaction 310, or a combination thereof. The visualization generator 322 can also be coupled to other modules as illustrated in FIG. 8 to visualize derivative data of the composite broadcast system 100.

The visualization generator module 322 can be coupled to an application interface module 326. The application interface module 326 is an application protocol interface that can interact directly with mobile and Internet applications. The application interface module 326 can receive an application input 328 including messages, comments, votes, images, media clips, action items, scripts, or a combination thereof in real-time from the applications over the network. The visualization generator module 322 can generate the visual aid 324 based on social interactions including the application input 328 received from the application interface module 326.

The composite broadcast system 100 can include a mix module 330 coupled to the selection module 316, the user input module 302, and the program AV module 320. The mix module 330 can composite audio and video streams from one or more instances of the user feed 304 and the program feed 217 into the livecast stream 122. The mix module 330 can include in the livecast stream 122 instances of the user feed 304 where the corresponding user terminal 106 is found in the user subset 318. The mix module 330 can also composite the visual aid 324 into the livecast stream 122 in real-time, such as an animation sequence, a bar graph, or a map.

The composite broadcast system 100 can include the broadcast engine 124 coupled to the mix module 330. The broadcast engine 124 can receive the livecast stream 122 from the mix module 330. The broadcast engine 124 can send the livecast stream 122 to an antenna, a cable switch, a dish, a broadcast server, or a combination thereof for distribution. The broadcast engine 124 can selectively distribute the livecast stream 122. For example, the broadcast engine 124 can selectively distribute to mobile devices only. For another example, the broadcast engine 124 can selectively distribute to tablets. For yet another example, the broadcast engine 124 can selectively distribute to only television sets or only to the anchor monitor 206.

Figure 4:
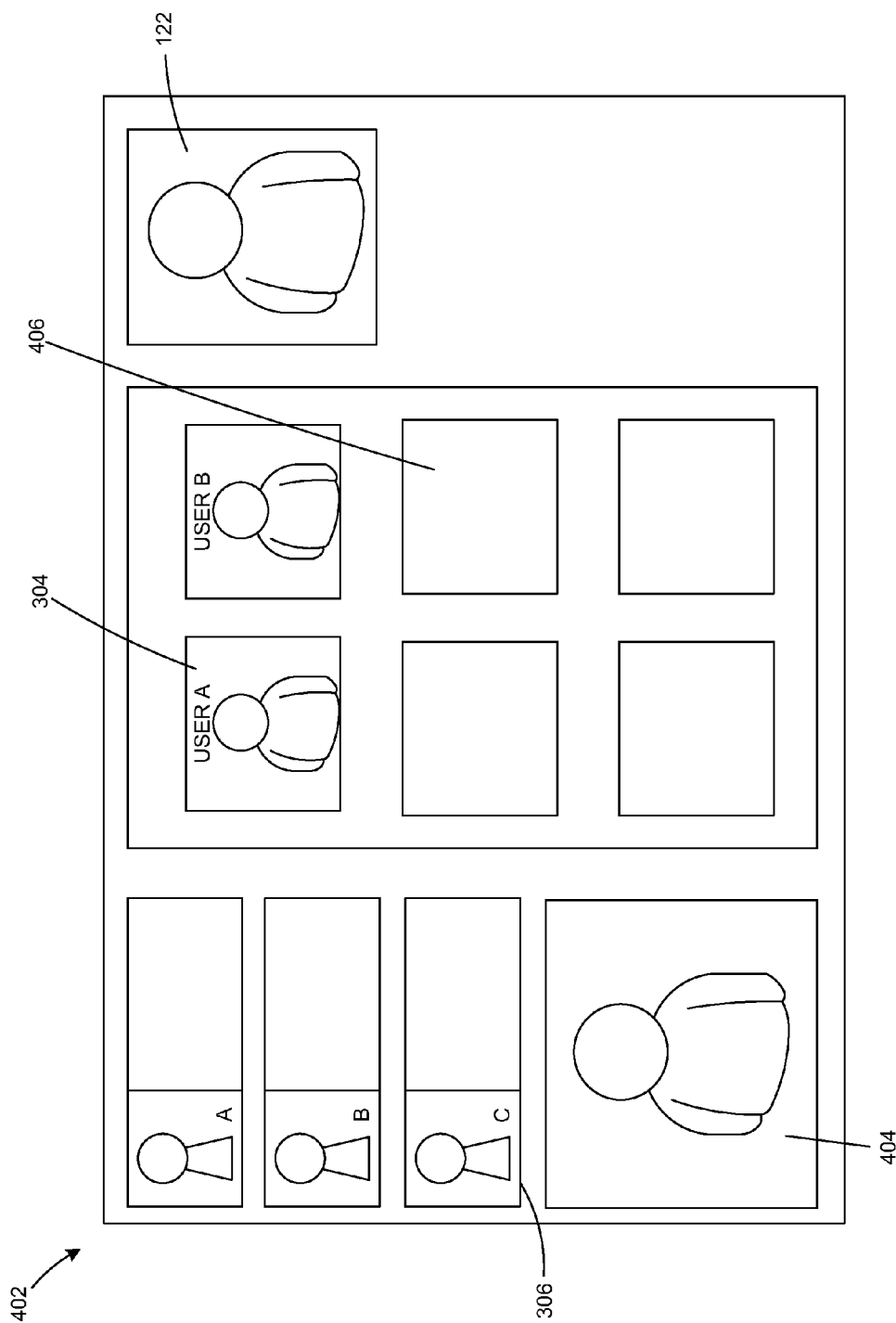
FIG. 4 depicts an example of a moderator console for a moderator operating the moderator terminal.

FIG. 4 depicts an example of a moderator console 402 for a moderator operating the moderator terminal 110.

FIG. 4 illustrates an example of a display of the moderator terminal 110 in the form of a graphical interface of the moderator console 402. The graphical interface can be used by the moderator to review the user profile 306 of different users appearing on the user list 314 of FIG. 3.

The moderator console 402 can include an area to show a moderator feed 404. The moderator feed 404 represents a video feed from the moderator terminal 110. The moderator feed 404 on the moderator console 402 can allow the moderator to see him/herself as him/herself would appear to the user terminal 106 during a video call.

The moderator console 402 can include a drop zone 406 for the moderator to drag and drop the user profile 306 to view the user feed 304 from the user of the user profile 306. Once the user profile 306 is dropped in the drop zone 406, the moderator terminal 110 can establish the user feed 304 with the user terminal 106. Further, once the user profile 306 is dropped in the drop zone 406, the moderator terminal 110 can establish a video call with the user terminal 106 such that the moderator on the moderator terminal 110 can speak to the user on the user terminal 106 and the user terminal 106 can view the moderator feed 404. A spy mode can be established with the user terminal 106 as well, where the user terminal 106 is warned about the presence of the moderator such that the moderator can see and hear from the user terminal 106, but the user terminal 106 cannot see the moderator feed 404.

The moderator console 402 can also include a display of the livecast stream 122. The livecast stream 122 can be displayed on a section of the moderator console 402 to show the moderator how the livecast stream 122 is being broadcasted out to the user terminal 106 and through the mass media.

The composite broadcast system 100 can include more than one instance of the moderator terminal 110 and hence more than one instance of the moderator console 402. The cast server 104 can host multiple media events including TV shows and radio shows.

It has been unexpectedly found that having multiple instances of the moderator console 402 running at the same time can function to load balance between the moderators operating each instance. It has also been unexpectedly found that having each of the cast server 104 supporting multiple media events can save system resources.

Figure 5:
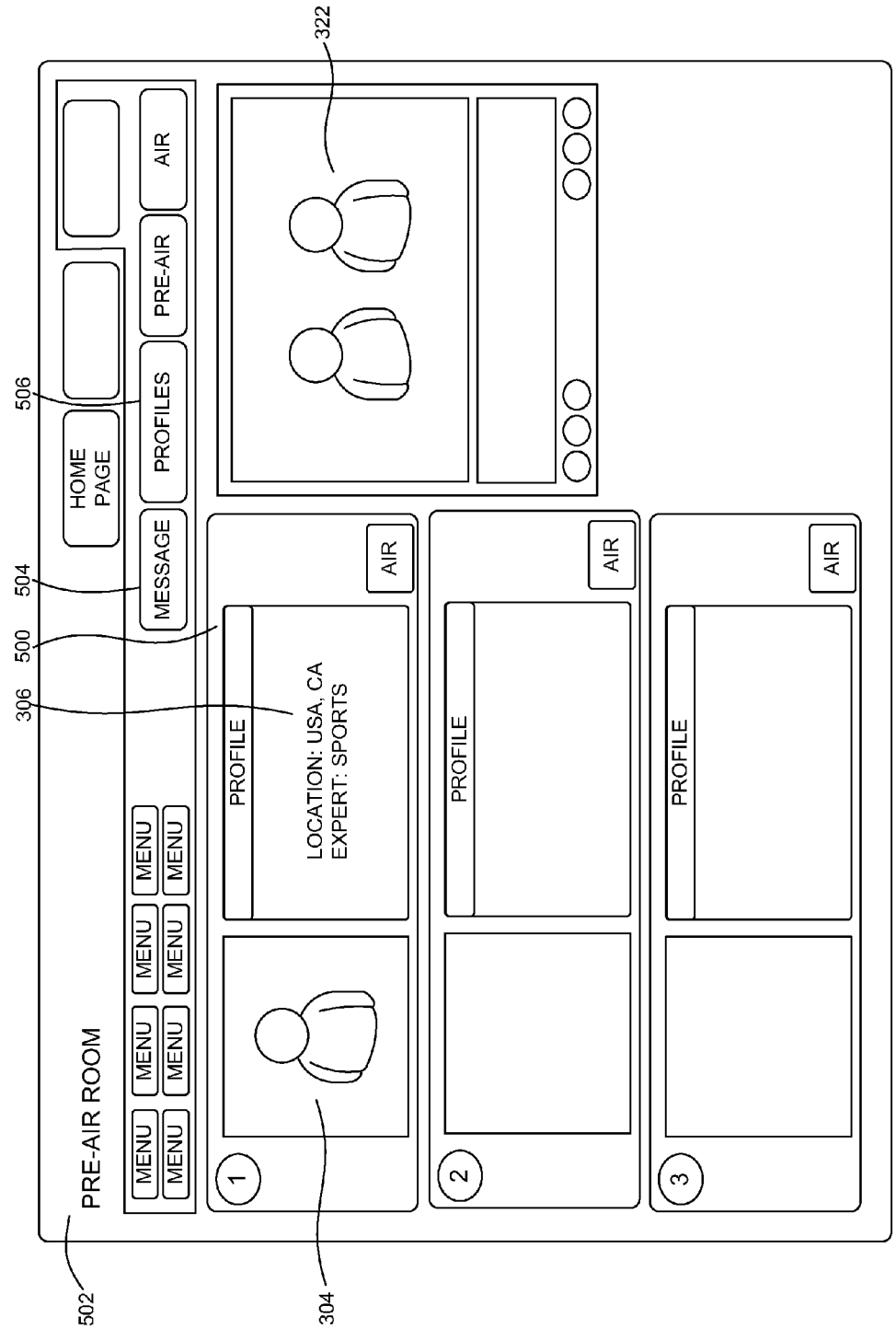
FIG. 5 depicts an example of a director console for a director operating the director terminal in pre-air mode.

FIG. 5 depicts an example of a director console 502 for a director operating the director terminal 112 in pre-air mode. FIG. 5 illustrates an example of a display of the director terminal 112 in the form of a graphical interface of the director console 502.

The graphical interface can be used by the director to review the user profile 306 as recommended for viewing by the moderator terminal 110 or to review the user profile 306 of a user who requests to be part of the livecast stream 122. The director console 502 can include the user feed 304 associated with the user profile 306.

The director console 502 in the pre-air moderation phase can manage the connected user, such as selecting which the user feed 304 to view on the director console 502 or to send on air, temporarily or permanently. The director console 502 can also exclude the user terminal 106 for not complying with a certain code of behavior.

The director console 502 can include a message interface 504 for sending and receiving text messages, tweets, chat text in a chatroom, or social network status updates. For illustrative purposes only, a button to open up the message interface is shown, however, it is understood that the message interface can be a console interface with a display of messages and where they are from. The message interface 504 can allow the director terminal 112 to publish at least some of the messages received by the message interface 504 on air in the livecast stream 122.

The director console 502 can also include a profile interface 506 for viewing a detailed display of all instances of the user profile 306 available to the director terminal 112. The director console 502 can be configured to only display instances of the user profile 306 as recommended by the moderator terminal 110. The director console 502 can also be configured to only display instances of the user profile 306 of any users who request to be on air.

For each of the user profile 306 displayed on the profile interface 506, the director terminal 112 can view the information regarding the user terminal 106, such as connection speed, video and audio quality, or connection date and time. For each of the user profile 306 displayed, the director terminal 112 can choose to select or deselect the user feed 304 to appear on the director console 502. The director terminal 112 can also exclude the user terminal 106 from the livecast stream 122 for a certain period of time, or permanently exclude the user terminal 106 from the livecast stream 122. The profile interface 506 can be implemented on the moderator terminal 110 as well.

The director console 502 can include the program feed 217 as well as the livecast stream 122 for the director to direct the show in real-time. The director console 502 can make the program feed 217 or the livecast stream 122 view in full screen at anytime. The director console 502 can be displayed on one or more monitors at a time.

Figure 6:
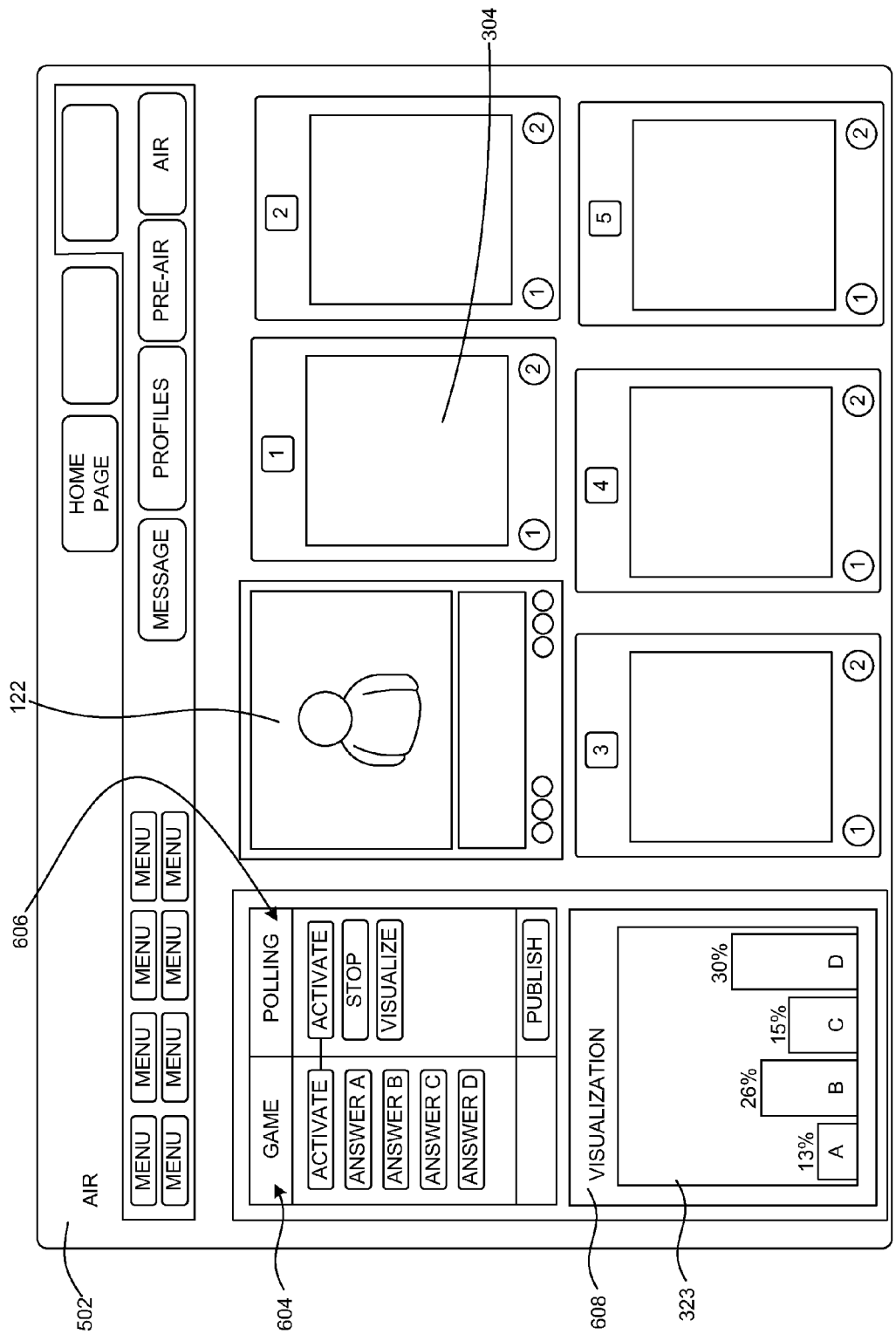
FIG. 6 depicts an example of the director console for a director operating a director terminal in on-air mode.

FIG. 6 depicts an example of the director console 502 for a director operating the director terminal 112 in on-air mode.

In the on-air mode, the director console 502 can include a user frame 602 containing the user feed 304. Instances of the user frame 602 are portions of the livecast stream 122 being aired that include the user feed 304 previously selected at the director terminal 112. The director console 502 can include the program feed 217 on a separate frame. The director console 502 can also include the livecast stream 122 including instances of the user feed 304, the program feed 217, and other visual aid 324 composed into a single live video being aired. In the on-air mode, the director operating the director console 502 can speak to the user operating the user terminal 106 without anybody listening to the director, the user, or both.

The director console 502 can include a game interface 604. The game interface 604 can be a corollary of the show being aired. For example, the game interface 604 can display a question being posted on the livecast stream 122 as well as potential answers to the question. The game interface 604 can interact with the user terminal 106 to obtain specific entries pertaining to the kind of game being played on air.

The director console 502 can include a poll interface 606. The poll interface 606 can be another corollary to the show being aired. For example, the poll interface 606 can control the display of the result of any kind of voting cast from the user terminal 106 connected to the composite broadcast system 100. The poll interface 606 can select its results from just the selected users from the user subset 318 or all instances of the user terminal 106 from the user list 314. The poll interface 606 and the game interface 604 can both be coupled to a visual interface 608 to display the visual aid 324 associated with the polling results or the game interactions. The results of poll interface 606 and the game interface 604 can be published and aired on the livecast stream 122.

The director console 502 can include augmented reality animations and interactions through an augmented reality interface 717. The augmented reality interface 717 can control animation of virtual objects from the user terminal 106 connected to the composite broadcast system 100. The augmented reality visualization environment can be implemented through the user terminal 106, the director terminal 112, or another synchronized device.

Figure 7:
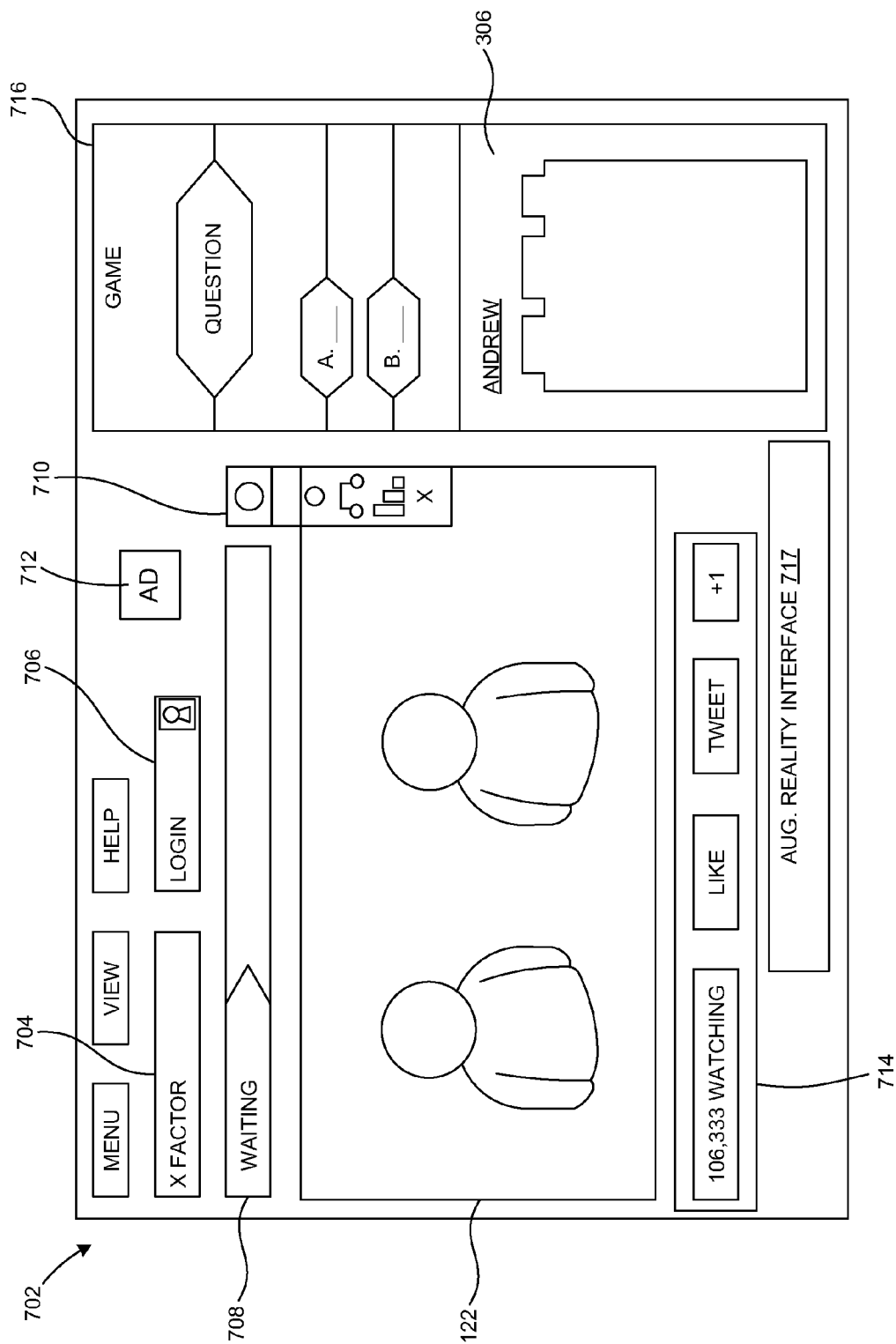
FIG. 7 depicts an example of a user console for a user operating the user terminal.

FIG. 7 depicts an example of a user console 702 for a user operating the user terminal 106. FIG. 7 illustrates an example of a display of the user terminal 106 in the form of a graphical interface of the user console 702.

The user console 702 can include a title area 704. The title area 704 can include a show title, a network/broadcaster logo, a network/broadcaster name, or a combination thereof.

The user console 702 can include an account area 706. The account area 706 includes account information associated with the user of the user terminal 106. For example, the account area 706 can include a username, a user avatar in forms of a profile picture, webcam take, or a combination thereof. The account area 706 can include account management functionalities, hardware system parameters settings, or a combination thereof.

The user console 702 can include the livecast stream 122 allowing the user of the user terminal 106 to follow the show during the video participation process. The user console 702 can control the audio output volume, audio input volume, location and size of the livecast stream 122 for display, or a combination thereof.

The user console 702 can include a status bar 708. The status bar 708 can follow the user during all the phases of video-participation including when the user is: (a) watching the livecast stream 122, (b) casting while being moderated, (c) backstage while interacting with the director terminal 112 to prepare for on-air participation, (d) on-air when the user is being broadcasted live, or (e) waiting to be connected.

While the user console 702 is in casting mode (b), the show is still available without the audio stream of the livecast stream 122 to facilitate the moderation process. The audio of the show goes on when the moderator terminal 110 turns off the video call with the user terminal 106. Even when the A/V communication is off, the moderator terminal 110 can communicate with the user terminal 106 via chat box. While the user console 702 is in backstage mode (c), the show is still available without the audio stream via the livecast stream 122 to facilitate the interaction with the director terminal 112. The audio of the show goes on when the director terminal 112 turns off the video call with the user terminal 106. Even when the A/V communication is off, the director terminal 112 can communicate with the user terminal 106 via chat box. While the user console 702 is in on-air mode (d), the director terminal 112 can communicate with the user terminal 106 by chat box to guide the user with ad hoc hints during the video participation.

The user console 702 can include a status light 710. The status light 710 illustrates the state of the hardware needed for the user terminal 106 to be connected to the composite broadcast system 100. For example, the status light 710 can include the status of a webcam, a microphone, a headphone, a network, a CPU, or a combination thereof. The status can be illustrated by a green light for optimal state, a yellow light for potential problems, and a red light for malfunction or error. As a specific example, the status light 710 for a network can show a yellow light when there is bandwidth problems, such as jitter or packet loss in upload and download, and a red light when there is no connectivity.

The user console 702 can include an advertisement area 712. The advertisement area 712 is a frame in the user console 702 where the composite broadcast system 100 can solicit the user with information about specific product or services. The advertisement area 712 can include an animation, an image, a link, text, or a combination thereof.

The user console 702 can include a social stream area 714. The social stream area 714 is a frame in the user console 702 where the user can comment on the show and where the user can view the comments about the show by other viewers. For example, the social stream area 714 can be a widget integrated with a social network such as FaceBook or Twitter. The widget can include a counter of how many people are watching the show and from what device or application. Comments can be analyzed through a semantic text recognition engine that can solicit the user through the advertisement area 712 with information about specific product or services based on the user comments and interests. The semantic text recognition engine is also capable to analyze the profile of the user and solicit the user with information about specific product or services based on the user profile 306 of FIG. 3. The semantic text recognition can be a module on the cast server 104, the director terminal 112, the user terminal 106, or any other machine in the composite broadcast system 100.

The user console 702 can include a window (not shown) that displays an electronic disclaimer to the user. This electronic disclaimer can be accepted and stored on the cast server 104. The electronic disclaimer can serve to acquire the rights to use the user's image and likeness on a particular platform, including the composite broadcast system 100 or any mass media.

The user console 702 can be embedded to a third party platform, such as FaceBook or iPhone. For example, when embedded within a social network, the user console 702 can open up a social room with the user's "friends" within the social network. The social room can allow a shared vision amongst all instances of the user console 702.

FIG. 8 depicts a block diagram of modules in the director terminal 112. The modules in the block diagram can be implemented as a hardware module or a software module on a machine such as the one described in FIG. 9. For example, the modules described can be implemented on the director terminal 112. Although the modules are illustrated to reside on the director terminal 112, it is understood that the modules can be implemented on other machines in the composite broadcast system 100, such as the moderator terminal 110, the monitor device 216, the cast server 104, or a combination thereof. The modules in the director terminal 112 can be used to create the visual aid 324 of FIG. 3 to be displayed in the livecast stream 122 or to provide information to the moderator terminal 110 and the user terminal 106 to facilitate the show hosted by the composite broadcast system 100.

The director terminal 112 can include an interaction analytics module 802, a game analytics module 804, a user rank module 806, a location analytics module 808, a show rating module 810, a poll statistic module 812, a fingerprint module 814, or a combination thereof. Again, it is understood that these modules and components can be implemented on another machine in the composite broadcast system 100.

The interaction analytics module 802 is for monitoring the interaction 310 recorded from the user terminal 106 with the composite broadcast system 100. The interaction analytics module 802 can keep a history of the interaction 310 made by the user, and provide derivative data such as frequency of interaction and average delay in response time. The interaction analytics module 802 can also keep track of the amount of positive and negative comments associated with each of the interaction 310 that is recorded.

The game analytics module 804 is for monitoring a game being played by a number of users on the show hosted by the composite broadcast system 100. The game analytics module 804 can track whether the rules of the game is being followed by the user terminal 106. The game analytics module 804 can calculate statistics of the game such as how many users remain in the game and where are the remaining users in the game. The game analytics module 804 can determine the winner of the game by monitoring inputs from the director terminal 112, the user terminal 106, the moderator terminal 110, the social media websites associated with the game, or a combination thereof.

The user rank module 806 is for monitoring the ranking of a user of the user terminal 106. As described above, ranking of the user can include an expertise ranking. The expertise ranking can be assigned by the director operating the director terminal 112 or a moderator operating the moderator terminal 110. For example, the director can assign a user as an expert in the field of history, represented by a four out of five stars in that field. The ranking of the user can include community reputation ranking. For example, the user rank module 806 can monitor the comments and votes regarding the user of the user terminal 106, and determine how many other users or viewers are voting the user as a favorite on the show.

The location analytics module 808 is for monitoring location related information of the users connected to the composite broadcast system 100. The location analytics module 808 can determine the geographical location of the user terminal 106. The location analytics module 808 can aggregate the location information of the users onto a map. The location analytics module 808 can visualize the number of users via the map.

The show rating module 810 is for monitoring the rating of the show. The show rating module 810 can determine the rating of the show based on the number of viewers, the number of active users, the number of users requesting to participate in the show, or a combination thereof.

The poll statistic module 812 is for monitoring results of a poll by the composite broadcast system 100. The poll statistic module 812 can collect a response from each of the user terminal 106. The poll statistic module 812 can generate the visual aid 324 for the results of the poll on the poll interface 606.

The fingerprint module 814 is for dynamically performing facial recognition, speaker recognition, account recognition, or a combination thereof to identify specific users of interest. The cast server 104 can modify the composite broadcast system 100 based on the recognized users. For example, the cast server 104 can dynamically change the bandwidth of the user terminal 106 when a face, voice, or account on the user terminal 106 is determined to be that of a user of interest. The users of interest can include a journalist, a celebrity, or other publicly known figures. The director on the director terminal 112 can maximize the bandwidth quality of the user feed 304 of FIG. 3 when the user feed 304 is determined to correspond to a user of interest. The fingerprint module 814 can include a fingerprint database that resides on any of the machines within the composite broadcast system 100. The fingerprint database can also reside on an external database or on a third party application.

Figure 9:
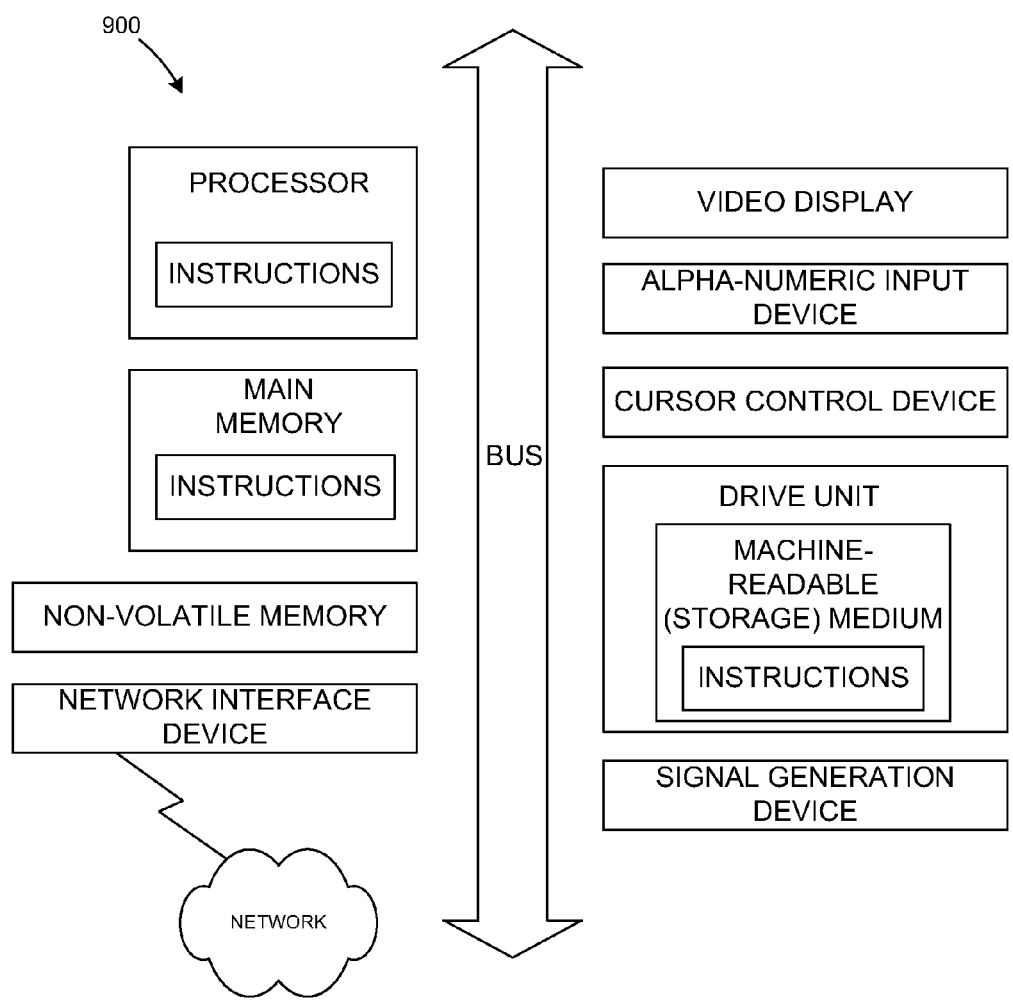
FIG. 9 shows a diagrammatic representation of a machine in the example form of a computer system within which a set of instructions, for causing the machine to perform any one or more of the methodologies or modules discussed herein, may be executed.

FIG. 9 shows a diagrammatic representation of a machine in the example form of a computer system 900 within which a set of instructions, for causing the machine to perform any one or more of the methodologies or modules discussed herein, may be executed.

In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the components depicted in the example of FIGS. 1-3, and FIG. 8 (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 900. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method of operation of a composite broadcast system comprising:
   receiving one or more than one live client AV streams from user stations and user profiles associated with the one or more than one live client AV streams;
   receiving user interaction and body gestures from the user stations;
   filtering, based on the body gestures and either the user interactions or the user profiles, from amongst the one or more than one live client AV streams, an on-air live client AV stream selected by the filtering for approval to air;
   receiving a program AV stream;
   generating a visualization based on the user interaction and the user profile; and
   mixing the on-air live client AV stream, the program AV stream, and the visualization for broadcasting to multiple devices.

2. The method of claim 1, wherein the mixing includes generating two video streams from the on-air live client AV stream, the program AV stream, and the visualization for broadcasting a 3D video.

3. The method of claim 1, wherein the mixing is optimized for broadcasting to a specific type of devices.

4. The method of claim 1, further comprising:
   determining a geographical location of the user station; and
   wherein generating the visualization includes generating the visualization based on the geographical location.

5. The method of claim 1, wherein approving the live client AV stream for airing includes approving from a director terminal.

6. A method of operation of a composite broadcast system comprising:
   receiving a live client AV stream from a user station and a user profile associated with the live client AV stream;
   filtering, based on the body gestures and either the user interaction or the user profile, from amongst a plurality of live client AV streams, the live client AV stream selected by the filtering for approval to air;
   receiving a program AV stream;
   receiving an application input from an API module;
   generating a visualization based on the application input; and
   mixing the live client AV stream, the program AV stream, and the visualization for broadcasting to multiple devices.

7. The method of claim 6, wherein receiving the application input from the API module includes receiving the application input from a mobile application.

8. The method of claim 6, wherein receiving the application input from the API module includes receiving the application input from a social network site.

9. The method of claim 6, wherein generating the visualization includes generating the visualization specific to a geographical area of viewers; and
   wherein the mixing is optimized for broadcasting to multiple devices within the geographical area.

10. The method of claim 6, wherein receiving the live client AV stream from the user station includes receiving the live client AV stream when the user station has been determined to not be on an exclusion list.

11. A composite broadcast system comprising:
    a user input module, coupled to a mix module, for receiving a live client AV stream from a user station and a user profile associated with the live client AV stream;
    a user interaction module, coupled to a visualization module, for receiving a user interaction from the user station;
    a selection module, coupled to the user input module, the user interaction module and the mix module, for filtering, based on the body gestures and either the user interaction or the user profile, from amongst a plurality of live client AV streams, the live client AV stream selected by the filtering for approval to air;
    a program AV module, coupled to the mix module, for receiving a program AV stream;
    the visualization module for generating a visualization based the user interaction and the user profile; and
    the mix module for mixing the live client AV stream, the program AV stream, and the visualization for broadcasting to multiple devices.

12. The system of claim 11, wherein the mix module is for generating two video streams from the on-air live client AV stream, the program AV stream, and the visualization for broadcasting a 3D video.

13. The system of claim 11, wherein the mix module selects and optimizes a mix of video streams for broadcasting to a specific type of devices.

14. The system of claim 11, further comprising:
    a location analytics module for determining a geographical location of the user station; and
    wherein the visualization module is for generating the visualization based on the geographical location.

15. The system of claim 11, wherein the selection module is for approving the live client AV stream from a director terminal.

16. The system of claim 11, further comprising:
    an application interface module, coupled to the visualization module, for receiving an application input; and
    wherein the visualization module is for generating a visualization based on the application input.

17. The system of claim 16, wherein the application interface module is for receiving the application input from a mobile application.

18. The system of claim 16, wherein the application interface module is for receiving the application input from a social network site.

19. The system of claim 16, wherein the visualization module is for generating the visualization specific to a geographical area of viewers; and wherein the mix module is for optimizing a mix to broadcast to multiple devices within the geographical area.

20. The system of claim 16, wherein the user input module is for receiving the live client AV stream when the user station has been determined to not be on an exclusion list.

21. A method of operation of a composite broadcast system comprising:
receiving a live client AV stream from a user station and a user profile associated with the live client AV stream;
filtering, based on the body gestures and either the user profile or user interactions, from amongst a plurality of live client AV streams, the live client AV stream selected by the filtering for approval to air;
approving the live client AV stream for airing based on the user profile;
receiving a program AV stream;
receiving an application input from an API module;
generating a visualization based on the application input;
receiving a social interaction feed regarding contents watched for user stations connected to the composite broadcast system;
determining to broadcast to a user device based on the social interaction feed and a social network of a user account operating the user device; and
mixing the live client AV stream, the program AV stream, and the visualization for broadcasting to multiple devices including the user device.

22. A composite broadcast system comprising:
a user input module, coupled to a mix module, for receiving one or more than one live client AV streams from user stations and user profiles associated with the one or more than one live client AV streams;
a user interaction module, coupled to a visualization module and the user input module, for receiving one or more than one user interactions from the user stations;
a social interaction module, within the user interaction module, for maintaining a social platform in the composite broadcast system and recording social interactions from the users;
a body language module, within the user interaction module, for collecting body gestures of the users;
a director console, coupled to the user input module and the user interaction module, for receiving the one or more than one live client AV streams and the user profiles from the user input module, the social interactions from the social interaction module and body gestures of the users from the body language module in real-time and deciding of selecting an on-air live client AV stream by filtering, based on the body gestures and either the user profiles or user interactions, the social interactions and body gestures, from the one or more than one live client AV streams;
a selection module, coupled to the director console, the user input module, the user interaction module and the mix module, for receiving the decision from the director console and forwarding the on-air live client AV to the mix module
a program AV module, coupled to the mix module, for receiving a program AV stream;
the visualization module for generating a visualization based the user interactions and the user profile;
the mix module for mixing the on-air live client AV, the program AV stream, and the visualization for broadcasting to multiple devices.

23. A method of operation of a composite broadcast system comprising:
receiving one or more than one live client AV streams from user stations, and user profiles and body gestures associated with the one or more than one live client AV streams;
selecting an on-air live client AV stream, by filtering and moderating, based on the body gestures and either the user profile or user interactions, from amongst the one or more than one live client AV streams;
receiving a program AV stream;
receiving an application input from an API module;
generating a visualization based on the application input; and
mixing the on-air live client AV stream, the program AV stream, and the visualization for broadcasting to multiple devices including the user device.

\* \* \* \* \*